United States Patent [19]

Bergere

[11] Patent Number: 4,627,191
[45] Date of Patent: Dec. 9, 1986

[54] ARTICLE FOR TREATING SOIL AROUND GROWING PLANTS

[76] Inventor: Emric W. Bergere, 7250 Frankline Ave., Los Angeles, Calif. 90046

[21] Appl. No.: 762,523

[22] Filed: Aug. 5, 1985

[51] Int. Cl.⁴ ............................................. A01G 17/00
[52] U.S. Cl. ........................................ 47/25; 47/48.5
[58] Field of Search ................... 47/9, 25, 32, 33, 48.5

[56] References Cited

U.S. PATENT DOCUMENTS

| | | | |
|---|---|---|---|
| 1,038,316 | 9/1912 | Dokkenwadel | 47/48.5 |
| 1,241,816 | 10/1917 | Boldt | 47/48.5 |
| 1,554,865 | 9/1925 | Magoon | 47/25 |
| 1,791,873 | 2/1931 | Neiman | 47/48.5 |
| 1,876,888 | 9/1932 | Ferguson | 47/48.5 |
| 1,929,300 | 10/1933 | Atkinson | 47/48.5 |
| 1,948,117 | 2/1934 | Kadow | 47/48.5 |
| 1,971,390 | 8/1934 | Vah Yahres | 47/48.5 |
| 2,038,019 | 4/1936 | Wright | 47/48.5 |
| 2,091,993 | 9/1937 | Jones | 47/48.5 |
| 2,222,815 | 11/1940 | Johnson | 47/48.5 |
| 2,380,721 | 7/1945 | Brigden | 47/48.5 |
| 2,931,140 | 4/1960 | Laffler et al. | 47/48.5 |
| 3,057,713 | 10/1962 | Gessler | 47/48.5 |
| 3,059,378 | 10/1962 | Noras | 47/25 |
| 3,059,379 | 10/1962 | Attoe | 47/48.5 |
| 3,060,012 | 10/1962 | Pavek | 47/48.5 |
| 3,555,728 | 1/1971 | Herns | 47/9 |
| 3,857,195 | 12/1974 | Johnson | 47/9 |
| 3,864,114 | 2/1975 | Green | 47/24 |
| 3,940,884 | 3/1976 | Mason | 47/32 |

FOREIGN PATENT DOCUMENTS 2118243 10/1972 Fed. Rep. of Germany .......... 47/33
2209216 8/1973 Fed. Rep. of Germany .......... 47/33

Primary Examiner—James R. Feyrer
Attorney, Agent, or Firm—Bogucki, Scherlacher, Mok & Roth

[57] ABSTRACT

A flat package containing fertilizer and/or other soil conditioners is formed from confronting relatively broad panels of Kraft paper, or the like, bonded together about their peripheries to define a sealed compartment for the soil conditioners. A plurality of the packages are placed in the soil about and adjacent a plant to encircle the plant stem. The packages are then pierced through their entire thicknesses, the number and size of the apertures so formed predetermining the rate at which the package contents are released to the soil surrounding the root system of the plant. The package configuration helps prevent overwatering and inhibits weed growth.

1 Claim, 6 Drawing Figures

ARTICLE FOR TREATING SOIL AROUND GROWING PLANTS

FIELD OF THE INVENTION

The present invention relates generally to a method of and an article for treating or conditioning the soil around plants. In particular, the method and article of the invention allow the user to predetermine the rate at which soil conditioning agents are released to the soil while inhibiting weed growth and helping to prevent overwatering of the root system.

BACKGROUND OF THE INVENTION

The proper conditioning of the soil about growing plants requires that the soil conditioners such as fertilizer be supplied to the root system slowly, steadily and evenly over a long period of time. A single sudden application of fertilizer, for example, may shock the plant, expose the root system to burning, deprive the plant of nutrients as it matures and weaken it against blight and insect attacks.

Various schemes have been devised for feeding plants by means of the slow disintegration of fertilizer sticks or cartridges. In these prior systems, the rate at which the fertilizer is released is predetermined principally by the geometry and other characteristics of the stick or cartridge. Because the user is unable to control the release rate, the amount of fertilizer applied to the soil over a given period is often incompatible with the needs of the plant. In addition, many known devices do not provide for the even distribution of the nutrients and other soil conditioners about the plant and root system but instead can provide only for localized soil treatment. Moreover, none of the known plant feeders is capable of controlling weed growth and the amount of water reaching the plant roots.

SUMMARY OF THE INVENTION

In accordance with the broad aspects of the present invention, there is provided a container or package of Kraft paper or the like enclosing fertilizer and/or other soil conditioners. The package may be laid on the top of the soil but preferably it is buried just below the surface and is so configured that a plurality of such packages may be placed about and adjacent the plant to encircle the stem. The user activates the package by piercing it with an appropriate pointed tool and the number and size of the apertures so formed predetermine the rate at which the package contents are released to the soil surrounding the root structure of the plant; uniform soil conditioning may be readily achieved by the appropriate distribution of the apertures.

Each package is preferably flat and comprises a pair of relatively broad panels so that the package tends both to shed water towards the periphery of the plant to help prevent overwatering of the roots and to inhibit weed growth about the plant stem.

In accordance with a preferred embodiment of the present invention there is provided a flat, generally L-shaped package enclosing a quantity of fertilizer and/or other soil conditioning agents. The package is formed of confronting panels of Kraft paper sealed about their peripheries to define an interior compartment containing the soil conditioners. Waste-free, low cost production of the packages may be achieved by utilizing L-shaped panels comprising four square units arranged in a three-by-two pattern. In use, two of such packages are laid flat just below the soil surface and placed together in complimentary fashion to form a central opening for the plant stem. The packages are then pierced with a nail, ice pick, or the like.

BRIEF DESCRIPTION OF THE DRAWINGS

A further understanding of the various features and advantages of the invention will be obtained from the ensuing detailed description read in conjunction with the accompanying drawings in which.

DETAILED DESCRIPTION OF THE INVENTION

Figure 1:
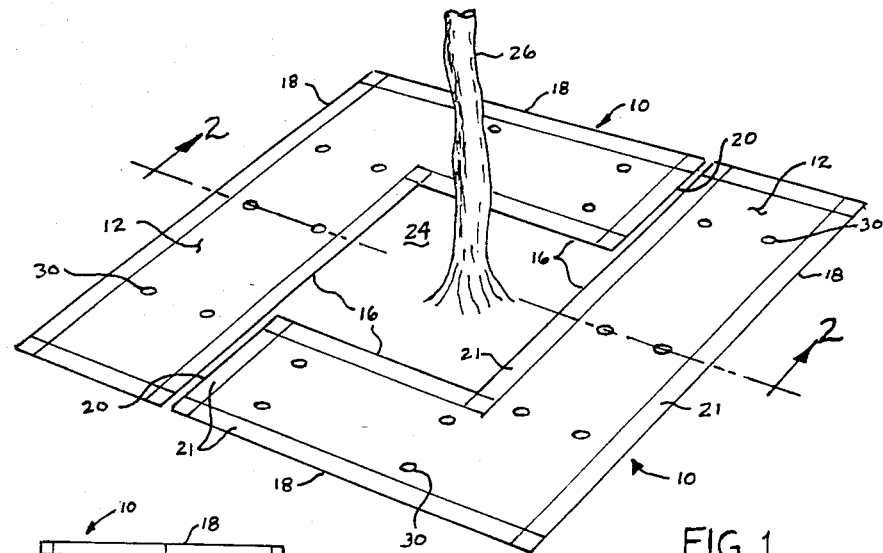
FIG. 1 is a perspective view of a preferred embodiment of the invention shown in place about a plant.
Figure 3:
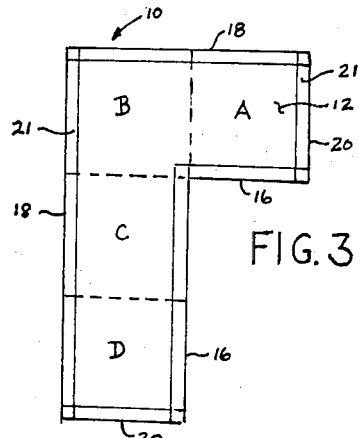
FIG. 3 is a plan view of a fertilizer package in accordance with the preferred embodiment.
Figure 2:
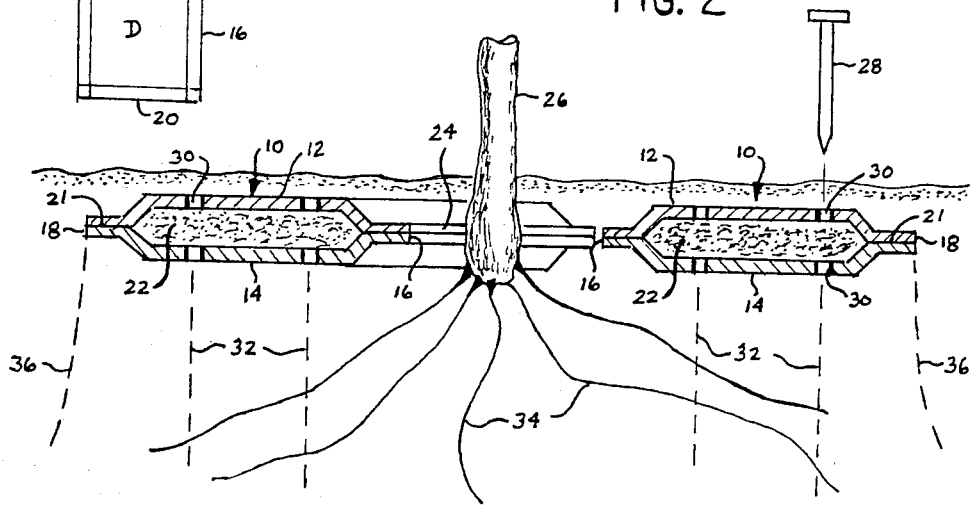
FIG. 2 is a cross section, as seen along the plane 2—2, of the article shown in FIG. 1.

FIGS. 1-3 show a first embodiment 10 of the soil conditioner package of the invention. Confronting, L-shaped panels 10 and 14 of Kraft paper or the like are joined about their entire peripheries along inner and outer edges 16 and 18, respectively, and ends 20 by a suitable adhesive or by heat welds 21 if plastic coated Kraft paper is used. The choice of package material and its thickness produce the desired life of the package which may range from two to six months by way of example. Where vegetable paper or similar material capable of slow decomposition is used, it becomes a mulch in the ground after it serves its purpose. If the package is to be replaced during the succeeding season it can be plastic coated on either or both faces to retard or control the rate of decomposition and provide porosity to rain or artificial irrigation. As noted, it is preferable that the inner face of each panel be plastic coated to facilitate heat sealing of the periphery.

It will be seen that the package 10 is relatively flat and has broad faces with the continuous peripheral bonds defining an interior compartment 22 filled with soil conditioning agents which may include fertilizer, fungicides, insecticides and so forth. The size of the package may be small for use with household potted plants while larger sizes may be used for trees and shrubs of any type.

Pairs of L-shaped packages arranged in complimentary abutting relationship as shown in FIGS. 1 and 2 define a central, square opening 24 for the plant stem 26. The packages may simply be laid on the surface of the soil; preferably, however, they are placed just below ground level, for example, 1 to 2 inches, as shown in FIG. 2. The packages are then activated by the user by piercing them through their entire thickness with a pointed tool 28 such as an ice pick or nail thereby forming apertures 30. The number, size and spacing of the apertures determine the feeding intensity and pattern. The aperture size may range from 1/16" to 3/16", for example, and for slow feeding, again by way of example, three apertures may be formed in the short leg of the L-shaped package while four apertures are made in the long leg.

FIG. 2 shows in somewhat schematic and idealized form the paths 32 of the dissolving soil conditioner. It will be evident from FIG. 2 that the relatively broad faces of the package can serve to provide uniform distribution of the soil conditioner across an area of sufficient width to cover substantially the entire root system 34. Moreover, the package shelters or protects the root system from being over-watered, a moisture control zone, shown generally by the broken lines 36, being defined by the peripheries of the packages.

Figure 4:
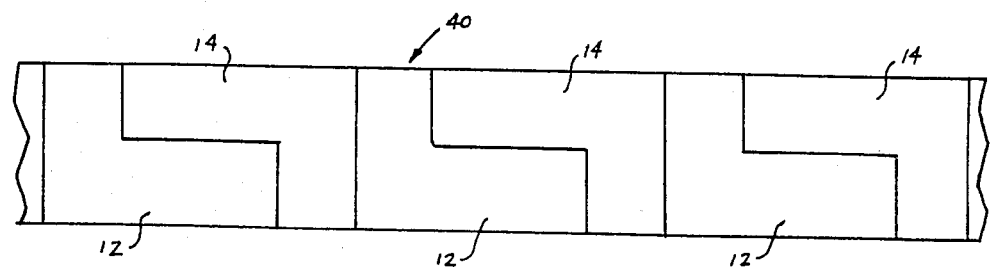
FIG. 4 is a plan view of a web of package material illustrating how the package of FIGS. 1-3 may be economically fabricated.

Turning now also to FIG. 4, there is shown a web 40 of material from which the package panels 12 and 14 may be conveniently and economically formed. By shaping each L-shaped panel so that it comprises four square units (indicated by the letters A, B, C and D in FIG. 3) and arranging these square units in a three-by-two pattern, it will be seen that the panels can be cut from the continuous web without waste. Alternatively, the opposing panels can be formed simultaneously by substituting flat, tubular stock for the individual webs.

In accordance with a specific example of the embodiment shown in FIGS. 1-4, the area units A, B, C and D may each be 3½ inches on a side. A package of this size will have a thickness of approximately ⅜ inch after filling.

Figure 5:
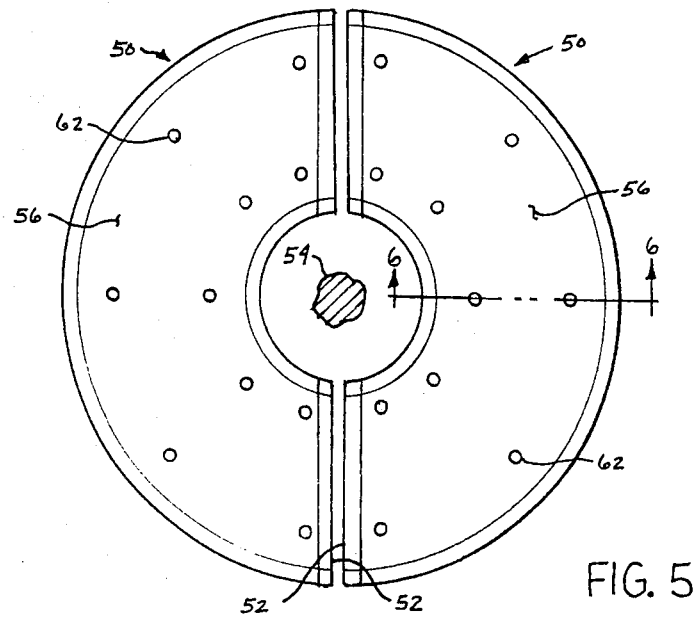
FIG. 5 is a plan view of an alternative embodiment of the invention.
Figure 6:
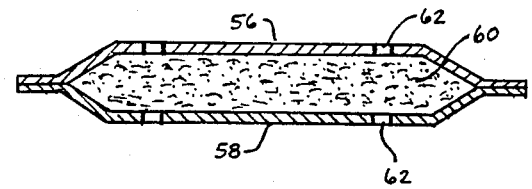
FIG. 6 is a cross-section of the package of FIG. 5, as seen along the plane 6—6.

FIGS. 5 and 6 show an alternative embodiment of the present invention in which each package 50 is in the shape of a portion of an annulus. In the specific embodiment under consideration, two such packages, with their ends 52 abutting, completely encircle the plant stem 54. As in the first embodiment, the package 50 comprises pairs of opposed panels 56 and 58 bonded about their peripheries to form a sealed compartment 60 containing appropriate soil conditioning agents. After placing the packages about the plant apertures 62 are formed by piercing the package, as already described.

The packages are fabricated by applying the bonds about the entire periphery of the package except for one of the ends through which the package is filled. After completion of the filling process, the open end is sealed.

What is claimed is:

1. A package containing soil conditioning agents, the package being adapted to be placed adjacent the stem of a plant and comprising:

a pair of confronting flexible, flat panels of at least initially moisture impermeable material joined along their peripheries by a continuous bond to define a sealed chamber containing the soil conditioning agents, the package being substantially flat and the panels defining surfaces so that in use the package shelters the root system of the plant against over-watering and inhibits weed growth, the confronting panels being adapted to be pierced by the user so as to predetermine the rate of release of the soil conditioning agents from the package, the panels being L-shaped whereby a pair of said packages may be placed in abutting, complimentary relationship to define a central opening for the plant stem, the area of each of the panels comprising four square units of equal area, the units being arranged in a three-by-two pattern facilitating the manufacture of said packages from a continuous web of panel material without waste.

* * * * *